Dec. 17, 1963
C. J. COBERLY ETAL
3,114,566
SHRINK FIT TUBING JOINT
Filed April 21, 1961
8 Sheets-Sheet 1
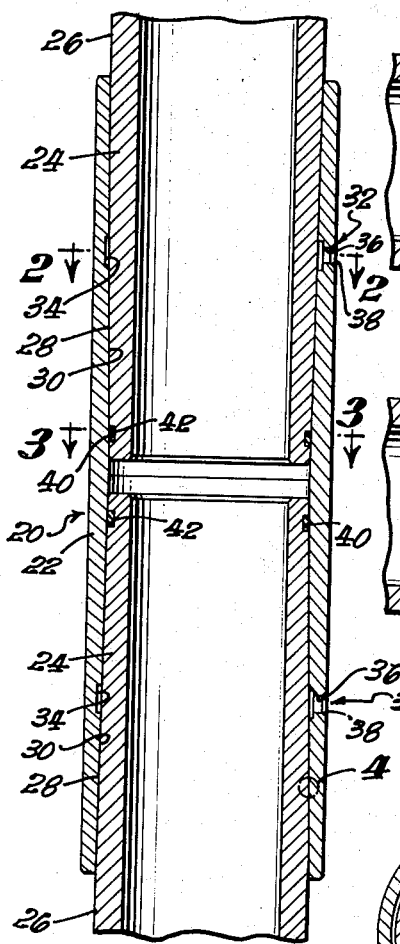
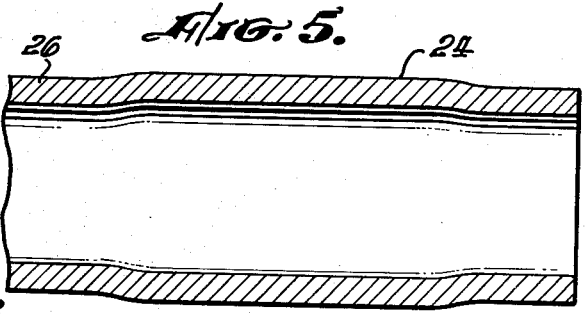
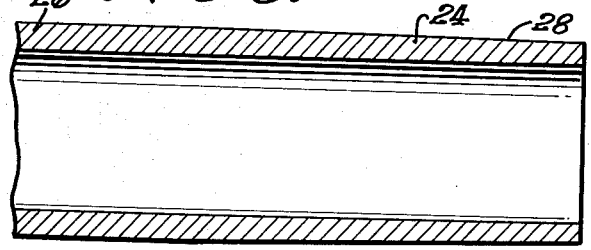
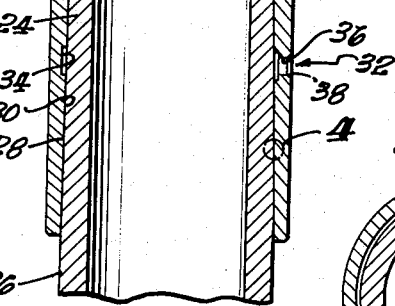
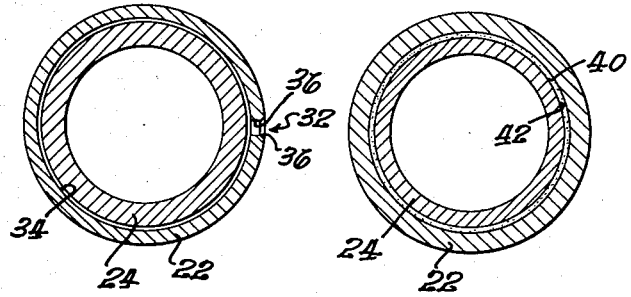
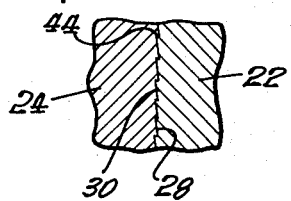
INVENTORS.
CLARENCE J. COBERLY,
FRANCIS BARTON BROWN,
By THEIR ATTORNEYS.
HARRIS, KIECH, RUSSELL & KERN.

Dec. 17, 1963 C. J. COBERLY ETAL 3,114,566
SHRINK FIT TUBING JOINT
Filed April 21, 1961 8 Sheets-Sheet 2
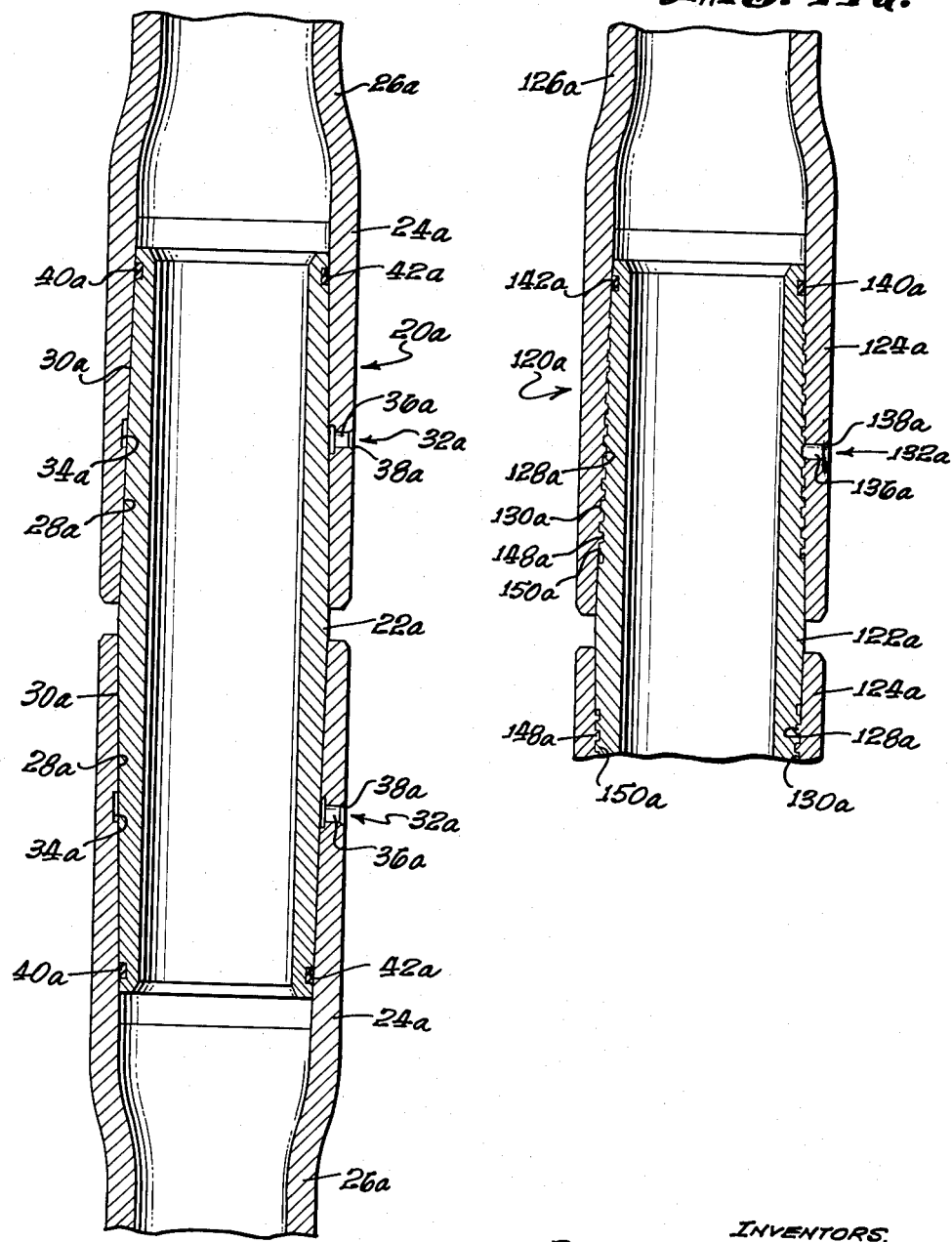
INVENTORS.
CLARENCE J. COBERLY,
FRANCIS BARTON BROWN,
BY THEIR ATTORNEYS.
HARRIS, KIECH, RUSSELL & KERN.

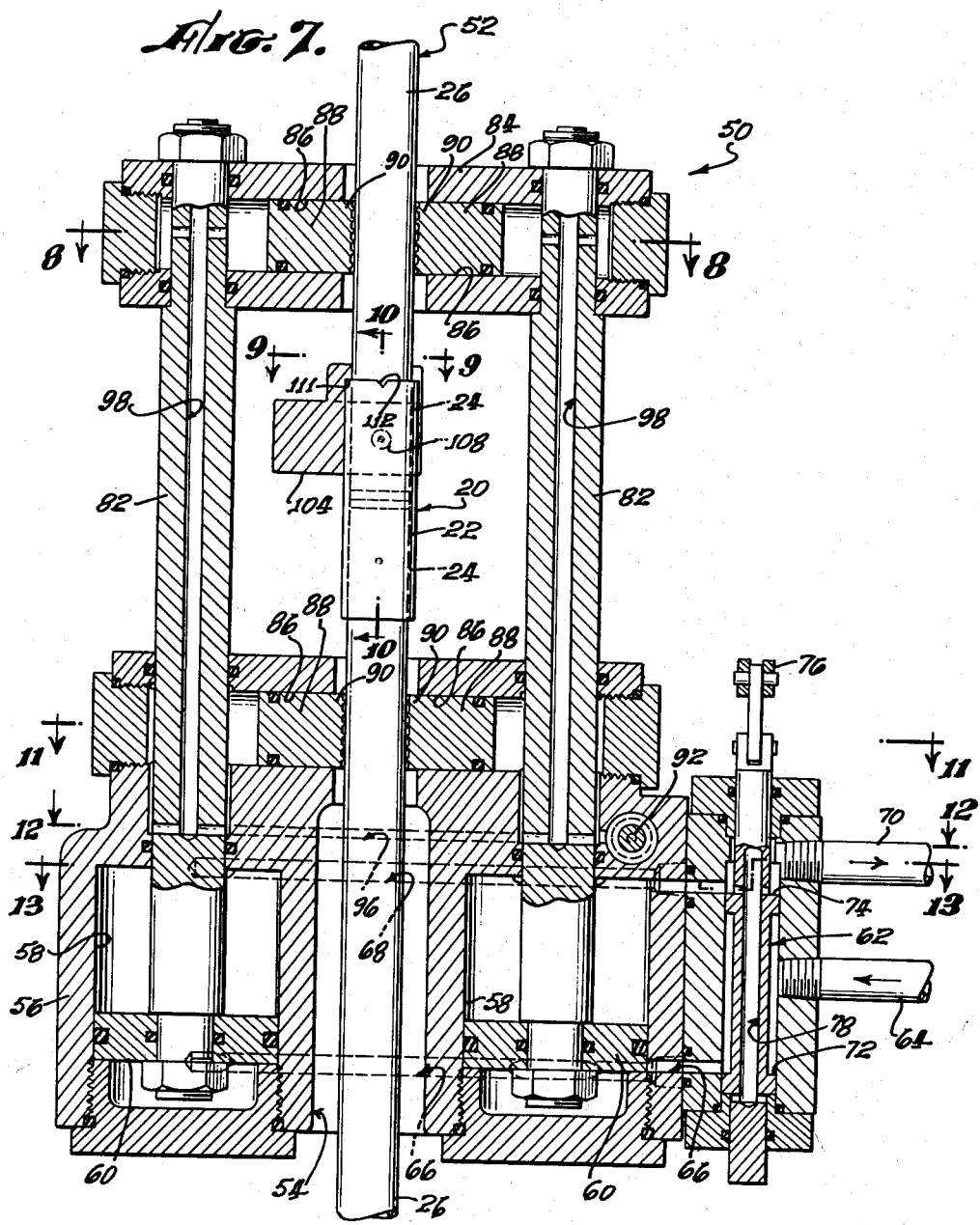

Dec. 17, 1963
C. J. COBERLY ETAL
3,114,566
SHRINK FIT TUBING JOINT
Filed April 21, 1961
8 Sheets-Sheet 4
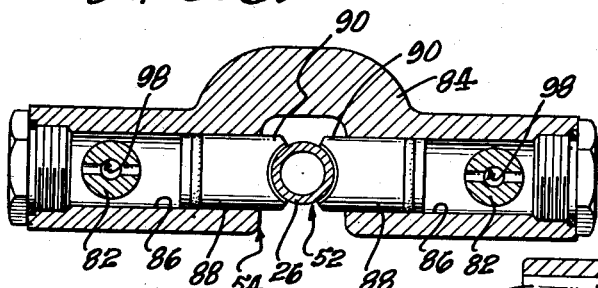
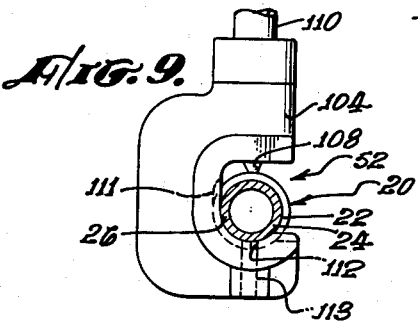
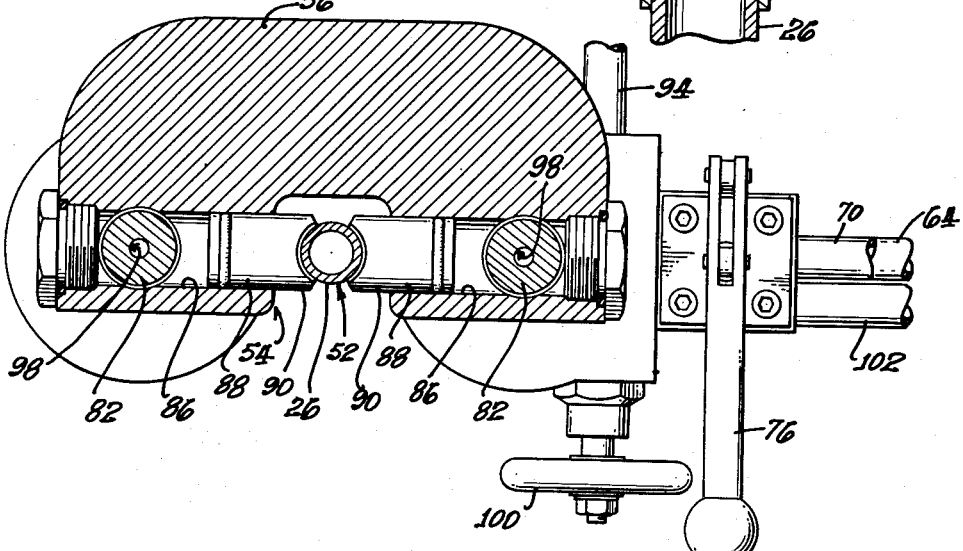
INVENTORS.
CLARENCE J. COBERLY,
FRANCIS BARTON BROWN,
BY THEIR ATTORNEYS
HARRIS, KIECH, RUSSELL & KERN.

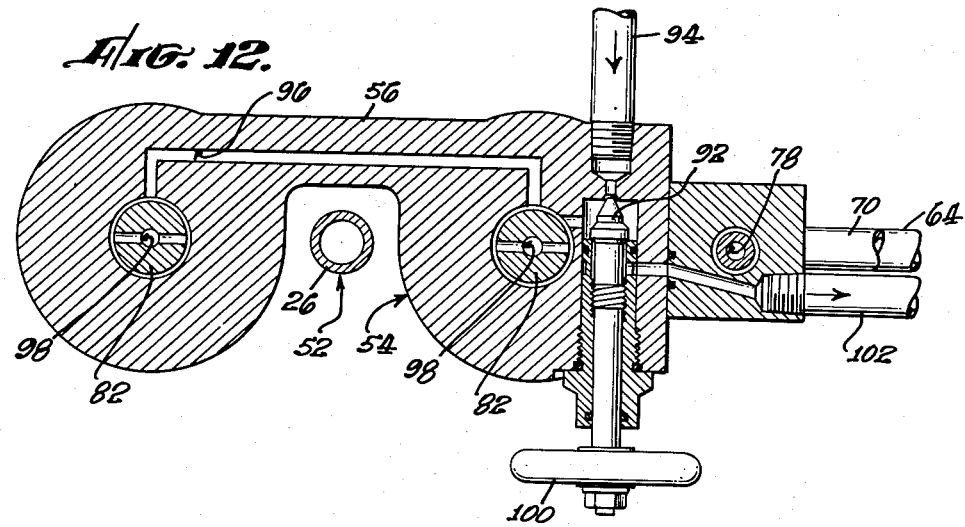
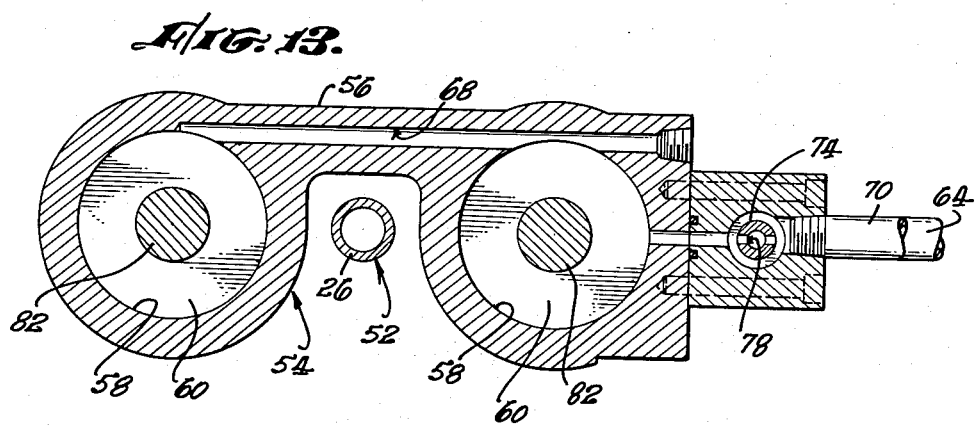

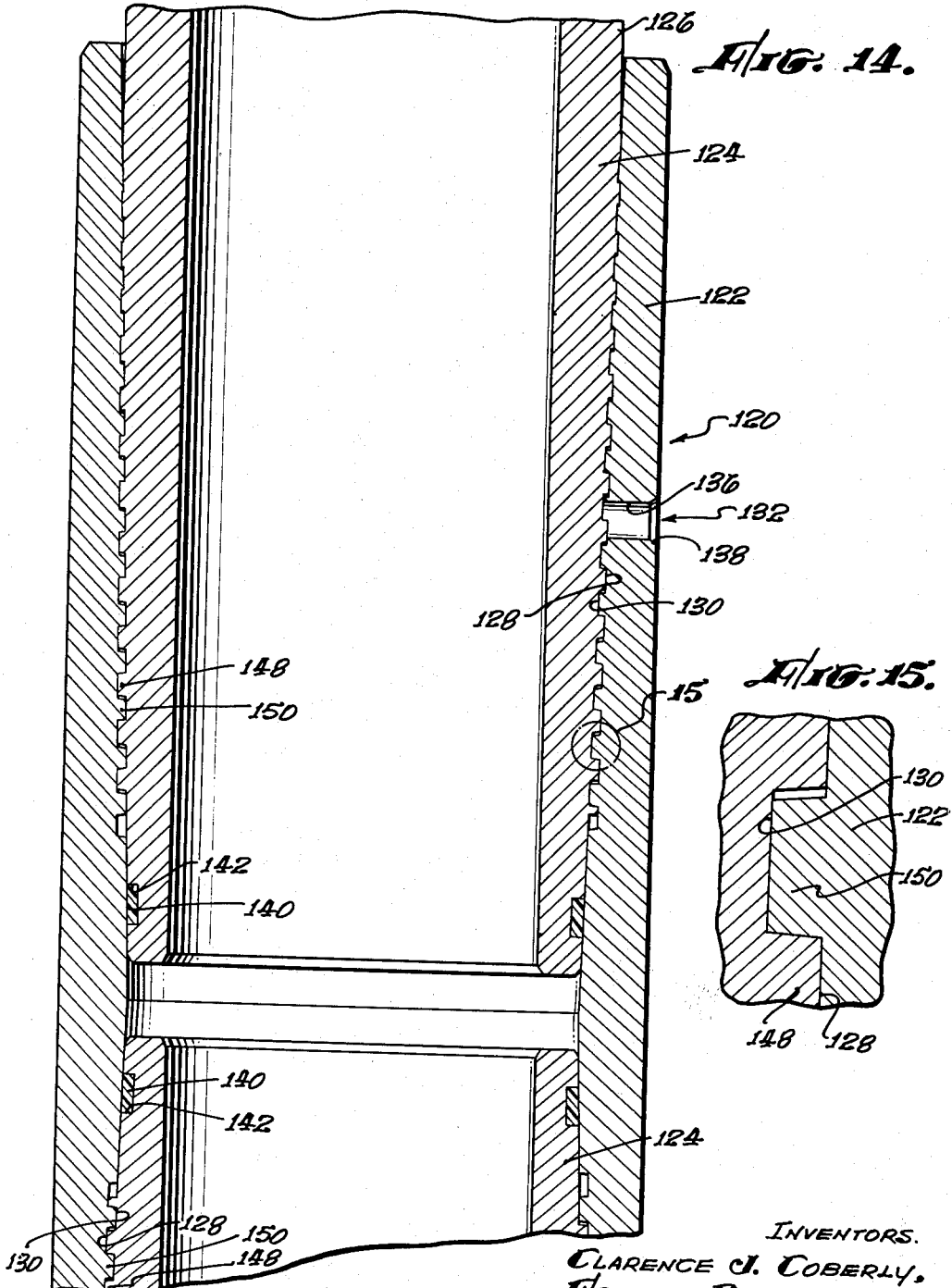

Dec. 17, 1963

C. J. COBERLY ETAL 3,114,566

SHRINK FIT TUBING JOINT

Filed April 21, 1961

INVENTORS.
CLARENCE J. COBERLY,
FRANCIS BARTON BROWN,
BY THEIR ATTORNEYS
HARRIS, KIECH, RUSSELL & KERN.

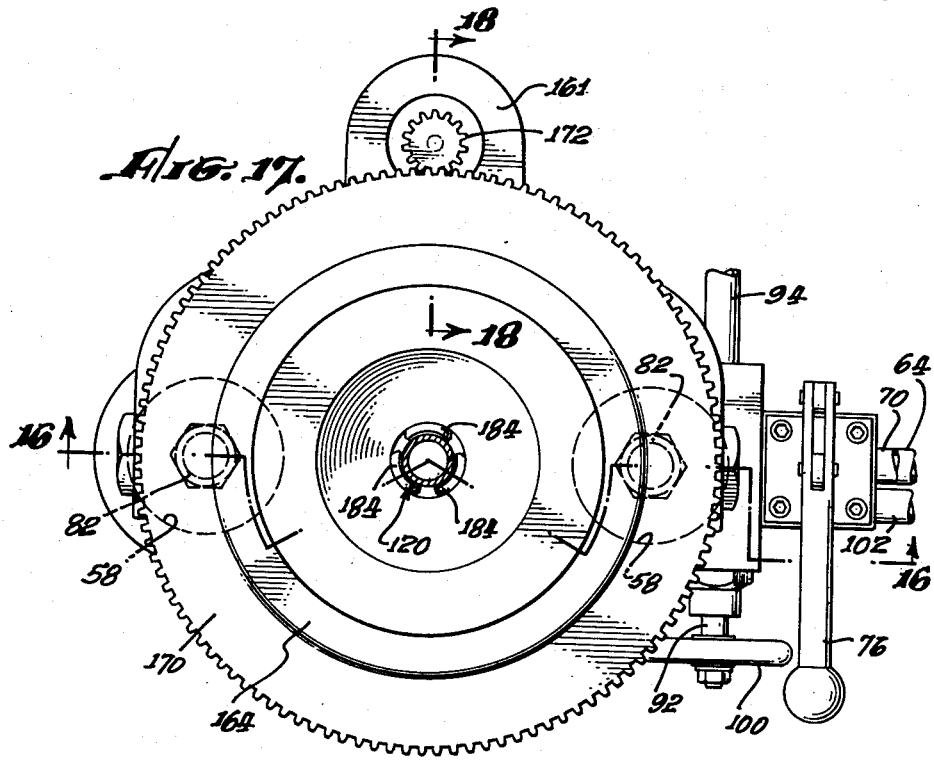
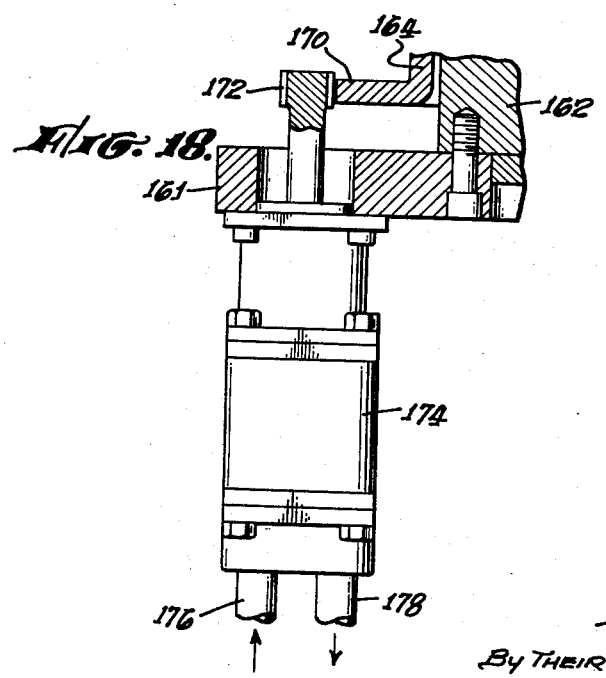

United States Patent Office 3,114,566
Patented Dec. 17, 1963

3,114,566
SHRINK FIT TUBING JOINT
Clarence J. Coberly, San Marino, and Francis Barton Brown, La Crescenta, Calif., assignors to Kobe, Inc., Huntington Park, Calif., a corporation of California
Filed Apr. 21, 1961, Ser. No. 104,564
14 Claims. (Cl. 285—18)

The present invention relates in general to the coupling and uncoupling of tubings capable of withstanding high internal fluid pressures and particularly suspended tubings, such as those used in oil wells, which are subjected to high tension loads due to their own weights or high radial and axial stresses due to high internal fluid pressure. The term "tubing," as used herein, is intended to include any tubular member, particularly a fluid conducting member. With particular reference to the oil industry, the term in question is intended to include tubing used in connection with the production of oil, or for other purposes, drill pipe, casing, and the like, including extra strength and double extra strength pipe or tubing known in the art, all tubings within the above definitions having a wall thickness that is relatively small compared to the outer diameter of the tubing. The term "tubing string," as used herein, is intended to include a plurality of tubings aligned along any axis for any of such purposes and connected by joints.

It is important in an oil well tubing string that the strength of each tubing joint be as close as possible to 100% of the strength of the tubings connected by the joint without, however, unduly increasing the diameter of the tubing string at the joint. Where 100%, or nearly 100%, of the tubing strength is required in the joint, the conventional practice is to upset the adjacent ends of the tubings and to externally thread such upset ends, the latter then being interconnected by an internally threaded coupling. The thickness of each tubing at the upset is usually sufficient to provide a net cross sectional area at the root of the first thread greater than the cross sectional area of the body of the tubing. In the case of ordinary tubing, the upset is usually external. With drill pipe, it is usually internal, while with casing, it may be either.

Upsetting the tubing ends has the disadvantage that they must be heated to the forging temperature of the particular material involved, which reduces the strength of the material unless it is subsequently subjected to heat treatment, which is quite expensive and therefore ordinarily not done. The upset-end tubing consequently has a section next to the upset end which has been heated, but not increased in cross-sectional area, and which is thus of lower strength than the body of the tubing. Therefore, upset-end tubings do not have 100% of the normal tubing strength even though the upset ends themselves may be stronger than the tubings. The foregoing situation is even more serious where the tubings have been subjected to some cold working since the effect of the cold working is destroyed in the sections which are heated to forging temperatures. Difficulties of this nature cannot be overcome by cold upsetting since the amount of upset required for the standard threads used is not practical with the steel alloys used for oil well tubings.

Efforts have been made to overcome difficulties of the foregoing nature by using special threads to obtain improved tubing joint strength, either with or without upsetting the tubing ends. However, such special threads are expensive and are not entirely satisfactory.

A general object of the present invention is to provide a tubing joint achieving a strength substantially equal to 100% of the normal tubing strength without reducing the strength of any portions of the tubings below normal, and to provide a tubing joint having an outside diameter less than conventional tubing joints.

More particularly, the invention contemplates, and a general object thereof is to provide, a tubing joint which does not require upsetting the tubing ends and which is a part of a coupling that adds less to the outside diameter of the joint than the couplings of conventional joints. Preferably, the present invention utilizes external couplings adapted to receive the tubing ends therein. However, in some instances, internal couplings might be used and the basic principles of the invention are applicable to such couplings also. In some cases internal couplings are actually preferred, as will be explained later.

Considering the invention more specifically, an important object thereof is to provide a tubing joint wherein the tubing ends and the coupling are held together entirely or primarily by friction, as contrasted to the mechanical interlocks which hold the tubing ends and couplings of conventional threaded tubing joints together.

Another important object of the invention is to provide a tubing joint wherein there is a shrink fit joint between each tubing end and the coupling, the latter being shrunk onto the tubing ends in the case of an external coupling.

Another object of the invention is to provide a tubing joint wherein there is a shrink fit joint between each tubing end and the coupling, the latter being internal and the tubing ends being shrunk onto the coupling.

Still another important object of the invention is to provide a tubing joint having a shrink fit joint between each tubing end and the coupling which is produced hydraulically so that the joint may be broken whenever desired.

Considering the invention still more specifically, a further important object thereof is to provide a tubing joint wherein the coupling and each tubing end have complementary, axially tapered surfaces which are frictionally interengageable and which are forced apart in the radial direction, to permit making or breaking of the joint, by injecting a fluid, such as oil, under high pressure into at least a portion of the interface between the tapered surfaces. In the case of an external coupling, such high-pressure fluid injection expands a portion of the coupling and contracts a portion of the tubing end, the reverse being true with an internal coupling. In either case, the fluid injection permits relative movement of the coupling and the tubing end in the axial direction, the coupling and the tubing end being moved toward each other in the axial direction in making up the joint, and being moved apart in the axial direction in breaking the joint.

Another object is to inject fluid under high pressure into the interface between the tapered surfaces at approximately the axial midpoints of the tapered surfaces so that only the intermediate portions of the tapered surfaces are forced apart in the radial direction, the end portions thereof remaining in engagement to prevent the escape of the injected fluid.

In making up a tubing joint in accordance with the invention, the intermediate portions of the tapered surfaces are hydraulically separated and the coupling and the tubing end are simultaneously moved toward each other in the axial direction until the tapered surfaces are more firmly seated against each other to the extent of stopping further relative axial movement. When the hydraulic pressure is relaxed, a very tight shrink fit is produced capable of achieving a joint strength which is a high percentage of the normal tubing strength. The contact pressure which can be obtained between the tapered surfaces in this fashion is much higher than the contact pressure which is obtainable with a threaded connection, and can be attained without galling the tapered surfaces since relative movement thereof occurs while they are hydraulically separated. In breaking the tubing joint, the tubing end and the coupling are moved apart in the axial direction while the fluid pressure is applied to the interface between the tapered surfaces. Normally, the pressure force components acting in the axial direction on the tapered surfaces are sufficient to separate the tubing end and the coupling.

Another object of the invention is to provide a tubing joint of the foregoing nature with an external coupling which is relatively thin, as compared to the tubings with which it is used, to minimize the diameter increase provided by the coupling and to produce a higher tensile stress in the coupling than in the tubings when the string is subjected to a tension load. With this construction, when the tubing string is subjected to a tension load, the coupling contracts more than the tubing ends so as to increase the tightness of the fit between the coupling and each tubing end, which is an important feature.

Another object is to provide an internal coupling having a yield strength greater than the ultimate strength of the tubing, so that when the tubing yields it contracts onto the coupling and increases the tightness of the fit between the tubing ends and the coupling.

Another important object of the invention is to increase the strength of the tubing ends by cold working, as by expanding the tubing ends and then contracting them to their original diameters. When the tubing ends are cold worked, they are made more resistant to radial contraction under tensile stresses and thus do not tend to pull inwardly away from the coupling as readily, the result being that the strength of the tubing joint will reach substantially 100% of, or may even exceed, the normal tubing strength, which is an important feature.

Another object is to cold expand the ends of the tubings for internal couplings to increase the yield strength of the tubings at the joint, which will give a joint strength in excess of the normal tubing strength.

Other objects of the invention are to provide a shrink-fit tubing joint in which the coefficient of friction of one or both of the tapered mating surfaces is increased by roughening, and, specifically, by machining a sharp edged, shallow, fine thread thereon, and to provide a shrink-fit tubing joint in which at least one of the tapered mating surfaces, preferably that on the coupling, is roughened, surface hardened and/or chrome plated.

Another important object of the invention is to provide a threaded tubing joint, having threads formed in tapered mating surfaces, wherein the major portion of the strength of the joint is obtained by means of a shrink fit of one of the tapered mating surfaces against the other, the principal purpose of the threads being to produce relative axial movement of the coupling and the tubing end, in response to relative rotation thereof, in making or breaking the joint. A related object is to hydraulically shrink a threaded coupling onto a threaded tubing end by injecting a fluid under high pressure into the interface between the tapered threaded surfaces in the manner hereinbefore outlined.

A further object is to provide a shrink-fit threaded tubing joint having threads the major and minor diameters of which are provided with different tapers such that the threads taper in depth from substantially zero to a maximum. More particularly, an object is to provide a shrink-fit threaded tubing joint having tapered external and internal threads in which the taper of the major diameter of the external thread is the same as the taper of the minor diameter of the internal thread, and the taper of the minor diameter of the external thread is the same as the taper of the major diameter of the internal thread.

Other objects are to provide a shrink-fit threaded tubing joint in which contact between the threads is obtained at both the crests and the roots of the threads with clearances at their flanks, to provide threads the maximum depth of which is less than one-quarter of the pitch thereof, and to provide threads of trapezoidal form wherein the maximum height of the trapezoid is less than one-half of the width thereof.

Another object is to make a threaded tubing joint having a tapered thread depth on both the tubing end and the coupling which vanishes at the ends of the joint to give 100% of the tubing cross section at this run-out point.

Another object is to make a threaded tubing joint having a tapered thread depth on both the tubing end and the coupling, and in which the coupling is external of the tubing end and in which the contact between the tubing end and the coupling is at the crest and root of the threads.

Another object is to make a threaded tubing joint having a tapered thread depth on both the tubing end and the coupling, and in which the coupling is internal and the tubing end is external and in which the contact between the tubing end and the coupling is at the crest and root of the threads.

Another object is to combined the shrink fit joint with a tapered threaded joint in which both the thread and the shrink fit contribute to the strength of the joint.

Yet another object of the invention is to provide a shrink-fit tubing joint having an annular fluid seal which prevents fluid within the tubing string from entering the interface between each pair of tapered mating surfaces to tend to force such surfaces apart in the radial direction. With an external coupling, such fluid seal will be at the smaller end of the tapered surface on the tubing end and adjacent the middle of the coupling.

Another object related to the one in the foregoing paragraph is to provide a shrink-fit tubing joint having a bleed downstream from the annular seal to prevent the application of the internal pressure within the tubing string to the interface between the corresponding tapered mating surfaces despite any leakage past the seal. A related object is to provide a construction wherein this bleed is the passage means for injecting fluid under high pressure into the interface between the tapered mating surfaces in making or breaking the tubing joint.

It will be apparent that the two seals in each coupling-type tubing joint confine the internal pressure so that it can act only radially outwardly to tighten the joint, and cannot act in the interfaces between the two sets of tapered maing surfaces to tend to loosen the joint, which is an important feature.

The foregoing objects, advantages, features and results of the present invention, together with various other objects, advantages, features and results thereof which will be evident to those skilled in the tubing joint art in the light of this disclosure, may be achieved with the exemplary embodiments of the invention described in detail hereinafter and illustrated in the accompanying drawings, in which:

FIG. 1 is a longitudinal sectional view of a coupling-type tubing joint which embodies the invention;

FIG. 1a is a longitudinal sectional view similar to FIG. 1, but showing another tubing joint of the invention;

FIGS. 2 and 3 are transverse sectional views respectively taken along the arrowed lines 2—2 and 3—3 of FIG. 1;

FIG. 4 is an enlarged, fragmentary, longitudinal sectional view duplicating the circled portion 4 of FIG. 1;

FIGS. 5 and 6 are longitudinal sectional views illustrating cold working of a tubing end in accordance with the invention;

FIG. 7 is a vertical sectional view of a coupling and uncoupling apparatus for making and breaking the tubing joint of FIGS. 1 and 1a;

FIGS. 8, 9, 10, 11, 12 and 13 are sectional views respectively taken along the arrowed lines 8—8, 9—9, 10—10, 11—11, 12—12 and 13—13 of FIG. 7;

FIG. 14 is a fragmentary longitudinal sectional view of still another coupling-type tubing joint of the invention;

FIG. 14a is a fragmentary longitudinal sectional view similar to FIG. 14, but showing yet another coupling-type tubing joint of the invention;

FIG. 15 is an enlarged, fragmentary, longitudinal sectional view duplicating the circled portion 15 of FIG. 14;

FIG. 16 is a view, partially in elevation and partially in vertical section, of a coupling and uncoupling apparatus for making and breaking the tubing joints of FIGS. 14 and 14a, FIG. 16 being taken along the irregular arrowed line 16—16 of FIG. 17;

FIG. 17 is a top plan view of the apparatus shown in FIG. 16; and

FIG. 18 is a fragmentary sectional view taken along the arrowed line 18—18 of FIG. 17 of the drawings.

*Tubing Joint 20*

Referring initially to FIGS. 1 to 3 of the drawings, illustrated therein is a coupling-type tubing joint 20 of the invention which includes an external coupling 22 receiving therein adjacent ends 24 of tubings 26. It will be noted that the tubing ends 24 have the same inside diameters and substantially the same outside diameters as the tubings 26 themselves. In other words, the tubing ends 24 are not upset, upsetting being unnecessary with the present invention.

The tubing ends 24 are provided with axially tapered, i.e., axially convergent, external surfaces 28. The coupling 22 is provided with axially tapered internal surfaces 30 which diverge toward the ends of the coupling and which are complementary to and frictionally engageable with the respective tapered surfaces 28 on the tubing ends 24. As will be discussed in more detail hereinafter, the tubing ends 24 are retained within the coupling 22 solely by friction between the tapered surfaces 28 and the tapered surfaces 30, respectively.

The coupling 22 is provided at approximately the axial or longitudinal midpoint of each tapered surface 30 thereof with a passage means 32 for injecting a fluid, such as oil, under high pressure into at least the central portion of the annular interface between the corresponding tapered surfaces 28 and 30. Each passage means 32 is shown as comprising an internal annular groove 34 in the coupling 22, a radial port 36 therein, and a radially-inwardly-convergent annular seat 38 for a fluid injection nozzle to be described.

In making up each of the joints represented by one-half of the complete coupling-type tubing joint 20 and later herein referred to merely as half of the tubing joint 20, i.e., in seating one of the tubing ends 24 in the corresponding end of the coupling 22, such tubing end is first inserted into the coupling and its tapered surface 28 is seated against the corresponding tapered surface 30 on the coupling both ahead of and beyond the passage means 32. Oil, or other fluid, under high pressure, which pressure may be as high as 30,000 p.s.i., or more, is then injected into the major portion of the annular interface between the corresponding tapered surfaces 28 and 30. This high fluid pressure within the interface expands the adjacent portion of the coupling 22 radially outwardly and contracts the adjacent portion of the corresponding tubing end 24 radially inwardly, without, however, breaking contact between the tapered surfaces at the inner and outer ends thereof since an axial make-up force is applied to the coupling and the tubing, as later described. Thus, the injected fluid is trapped in an intermediate annular portion of the interface. The foregoing action may best be understood by visualizing each longitudinal strip of the tapered surface 28 as bowing inwardly and the corresponding longitudinal strip of the tapered surface 30 as bowing outwardly for a substantial axial distance on either side of the annular groove 34, the tapered surfaces 28 and 30 remaining in sealing engagement adjacent their ends to confine the injected fluid within the interface.

It will be understood, of course, that when fluid is injected into the interface between each set of tapered surfaces 28 and 30 in the foregoing manner, the coupling 22 and the corresponding tubing end 24 must be biased axially toward each other to prevent axial separation due to the action of the injection pressure on the projected areas of the tapered surfaces. An apparatus for accomplishing this will be described hereinafter in connection with FIGS. 7 to 13 of the drawings.

As the injection pressure within the interface between each set of tapered surfaces 28 and 30 builds up, the coupling 22 and the corresponding tubing end 24 are moved toward each other in the axial direction to increase the extent to which the tubing end is inserted into the coupling. After the maximum injection pressure has been reached and the tubing end 24 under consideration has been bottomed within the coupling 22, the application of the injection pressure is discontinued and excess injected fluid is permitted to escape through the corresponding passage means 32. Under these conditions, the tubing end 24 expands radially outwardly and the coupling 22 contracts radially inwardly, with the result that the coupling is shrunk onto the tubing end very tightly.

The same procedure is followed in making up the other half of the tubing joint 20, and, as will be apparent, the reverse procedure is followed in breaking each half of the tubing joint. When breaking half of the tubing joint 20, the injection pressure acting on the projected areas of the corresponding tapered surfaces 28 and 30 is normally sufficient to produce axial separation of the coupling 22 and the corresponding tubing end 24. Actually, it may be necessary to restrain the axial separation of the coupling 22 and the corresponding tubing end 24, this being accomplished by the apparatus hereinafter described in connection with FIGS. 7 to 13 of the drawings.

It will be noted that when making up and breaking each half of the tubing joint 20, the major portions of the corresponding tapered surfaces 28 and 30 are physically separated by the injected fluid. Also, the contact pressures necessary to provide fluid tight seals at the ends of the interface are not excessively high. Consequently, galling of the tapered surfaces 28 and 30 in response to relative axial movement thereof does not occur despite very high contact pressures between the tapered surfaces after the joint half in question is made up. Consequently, either half of the tubing joint 20 may be made up and broken repeatedly.

An annular seal 40, shown as located in an external annular groove 42 in the corresponding tubing end 24, is disposed between the tapered surfaces 28 and 30 of each pair adjacent their inner ends. The purpose of the seals 40 is to prevent any internal pressure which may exist in the tubing string in operation from being applied to the interfaces between the sets of tapered surfaces 28 and 30 to tend to loosen the tubing point 20. It will be noted that any internal fluid which may leak past the annular seals 40 into the interfaces between the tapered surfaces 28 and 30 escapes through the radial ports 36. Consequently, no joint-loosening pressure can build up in the interfaces between the tapered surfaces 28 and 30, the two passage means 32 acting as bleeds to prevent this.

It will also be noted from the foregoing that any internal pressure which may exist in the tubing string in operation merely tends to tighten the tubing joint 20 since it acts outwardly on the tubing ends 24 to tend to expand them into more positive engagement with the coupling 22. To prevent the internal pressure from having any significant expanding effect on the coupling 22 itself, the axial separation between the innermost extremities of the two tubing ends 24 is kept as small as practicable.

With the foregoing as background, various design considerations of the invention which enter into the structure of the tubing joint 20, and into the materials used for the coupling 22 and the tubing ends 24, will now be discussed.

The axial length of each pair of tapered surfaces 28 and 30 which is necessary to achieve a joint strength substantially equal to 100% of the normal strength of the tubings 26 depends primarily on the coefficient of friction between the tapered surfaces and upon the contact pressure therebetween. Expressed differently, the strength of each half of the tubing joint 20 may be increased by increasing the axial length thereof, the coefficient of static friction between the corresponding tapered surfaces 28 and 30, or the contact pressure between these surfaces. Preferably, the axial length of each set of tapered surfaces 28 and 30 is kept as small as practicable in order to avoid an excessively long tubing joint 20. Therefore, the contact pressure and the coefficient of friction are made as high as possible.

The maximum unit contact pressure applied to each tubing end 24 by the coupling 22 must result in a hoop compressive stress within the tubing end which is less than the yield strength of the material of which it is made. Likewise, the maximum unit contact pressure is limited by the maximum hoop tensile stress in the coupling 22, which stress must be lower than the yield strength of the coupling. By using a material for the coupling 22 having a higher yield strength than the tubing ends 24, the wall thickness of the coupling can be less than the wall thickness of the tubings 26, which is important since it results in a coupling which increases the diameter of the tubings 26 at the joint 20 less than the coupling of any conventional threaded joint.

Considering the foregoing from a somewhat different point of view, the basic principle involved in the tubing joint 20 is to maintain the stress in the joint less than the yield stress. In order that the contact pressure will not be reduced under tensile stresses approaching the yield stress, the coupling 22 is made thinner than the tubings 26 and is made of a stronger material, but one which has substantially the same modulus of elasticity. For example the coupling may be of Nitralloy, a nitriding steel (yield strength about 140,000 p.s.i., ultimate strength about 150,000 p.s.i., elongation in 2", full section, about 17.5%), used with steel tubing such as API H-40 (yield strength 40,000 p.s.i., ultimate strength 60,000 p.s.i., elongation in 2", full section, 32%), J-55 (yield strength 55,000 p.s.i., ultimate strength 75,000 p.s.i., elongation in 2", full section, 25%), N-80 (yield strength 80,000 p.s.i., ultimate strength 100,000 p.s.i., elongation in 2", full section, 18%) or steels of even higher strength. With this construction, as long as the tensile stresses are within the elastic limit and taking into account Poisson's ratio, the coupling 22 will contract more under a tension load applied to the tubing string than will the tubing ends 24. Therefore, under these conditions, the contact pressure between the tapered surfaces 28 and 30 of each pair is actually increased, with an increase in the tension load, up to the yield point of the corresponding tubing end, which is an important feature. At the yield point, each tubing end 24 will reduced in diameter faster than the coupling 22, with the result that the contact pressure will be reduced and the tubing joint 20 will fail by pulling out of one or both of the tubing ends 24. Thus, the maximum strength of the tubing joint 20 can equal, but not exceed, the tensile elastic limit of the tubing ends 24.

As previously stated, the strength of the tubing joint 20 depends upon the coefficient of friction between each pair of tapered surfaces 28 and 30, as well as on the other factors outlined. With normal machining in forming the tapered surfaces 28 and 30, a coefficient of friction of 0.20 is achieved. With such a coefficient of friction, and with the maximum contact pressure between the tapered surfaces 28 and 30 discussed previously herein, the axial length of the tapered surfaces 28 and 30 is of the order of 2.0 to 2.5 times the outside diameter of the tubing 26. Merely by way of example, the length of the coupling 22 under such conditions for typical oil well tubing having a nominal size of one-half inch would be of the order of magnitude of four inches, which is reasonable.

It has been found that if either the tapered surfaces 28 or the tapered surfaces 30, and preferably the latter since the coupling 22 is formed of the stronger and harder material and is more conveniently handled, are roughened somewhat, the coefficient of friction can be increased considerably. For example, if each end of the coupling 22 is bored with a tool shape and feed which will provide the corresponding tapered surface 30 with the equivalent of a fine thread 44, FIG. 4, of buttress form and with a sharp crest, such thread will deform the corresponding tapered surface 28 to provide the equivalent of a very shallow threaded engagement between the two tapered surfaces. Even using a depth for the thread 44 of less than 0.001 inch, the effective coefficient of friction is increased to in the neighborhood of 0.40. Consequently, all else being equal, the over-all length of the coupling 22 for ordinary half-inch oil well tubing may be reduced to around two inches.

The effectiveness of the shallow, fine threading of the tapered surfaces 30 of the coupling 22 can be increased further by surface hardening or plating, preferably chrome plating. This insures that the threads 44 on the tapered surfaces 30 will not be deformed even after repeated making and breaking of the tubing joint 20.

It has also been found that the strength of the tubing joint 20 can be increased further to a point where the ultimate tensile strength, as opposed to the tensile yield strength, of the tubings 26 is achieved. This may be accomplished by cold working the tubing ends 24 to increase the elastic limit of the material of the tubings 26 in the regions where such material is subjected to the contact pressure of the coupling 22. Such cold working of the tubing ends 24 may be accomplished in various ways, the preferred one being to initially expand each tubing end, as shown in FIG. 5, and then reducing it to its original dimensions and providing it with the tapered surface 28, as shown in FIG. 6 of the drawings. Such double cold working of the tubing ends 24 increases the elastic limit of the material of the tubing ends to a value of the order of the ultimate strength of the original tubings 26. The amount of expansion and subsequent contraction, and thus the resulting increase in the elastic limit, depends on the material of tubings 26, some tubing materials conventionally used in the oil industry being susceptible to greater increases in the elastic limit than others.

The foregoing preferred cold working of the tubing ends 24 may be carried out in various ways. For example, the initial expansion of FIG. 5 may be produced mechanically, hydraulically, explosively, or the like. Contracting the expanded tubing end back to its original dimensions may also be effected in any one of these ways. Preferably, however, the final contraction is produced by swaging onto a mandrel, not shown, which is placed inside the tubing end 24 to control the inside diameter. The swaging operation may also be caused to provide the desired external axial taper on the tubing end 24, so that only a small amount of material needs to be removed by machining to form the final tapered surface 28.

While it was stated previously that upsetting is not required by this invention, it is possible and sometimes desirable to cold upset to a minor extent to obtain the necessary cold working. In applying internal pressure to butt welded tubing it is difficult to get enough expansion to obtain the required increase in yield without danger of causing the weld to fail. Upsetting does not introduce as large a value of hoop tension as expanding with internal pressure. When each tubing end 24 is upset in this manner, the tubing 26 is gripped with slips behind the length which is to be upset. A solid mandrel is placed inside the tubing 26 to prevent collapsing due to the slip pressure. A die is placed outside the tubing end 24 to limit the expansion and the upsetting die ram which is used has a projection equal in diameter to the inside diameter of the tubing 26 to prevent any reduction in the inside diameter and to force the thickening of the tubing wall to the outside. A 10% to 15% increase in wall thickness is sufficient to produce the desired increase in the yield strength. Also the 10% to 15% increase in wall thickness is equivalent in joint strength to a corresponding increase in unit yield strength. A double benefit is therefore obtained. Since the wall thickness on half-inch tubing is 0.109 inch, a 10% increase makes the wall thickness 0.12 inch which adds only 0.02 inch to the outside diameter of the tubing 26. A 15% increase would only add 0.03 inch to the joint diameter. It has been found that the force used can be applied rapidly, using the inertia of the tubing 26 to partly resist the force. This may be done with an explosive acting on the area of the end of the ram which does the upsetting. Such explosive forming is a very simple way of performing this operation and does not require any heavy equipment.

Tubing Joint 20a

An alternate coupling-type tubing joint 20a using the same basic principles is shown in FIG. 1a, corresponding elements being identified by the same reference numerals plus the suffix "a". In this case the ends 24a of the tubings 26a are expanded and the coupling 22a is internal. The internal taper of surface 28a in tubing end 24a is axially divergent, the diameter being largest at the extremity of the tubing. The coupling 22a has matching external tapered surfaces 30a which converge toward the ends of the coupling. The tapered surfaces 28a and 30a of the tubing ends 24a and the coupling 22a are frictionally engaged under contact pressure which will develop the full strength of the tubings 26a.

Since each tubing 26a is enlarged to form the external part of the tubing joint 20a, this may be done cold so that the resulting cold working of the metal raises the yield strength of the tubing at the joint. This therefore corresponds to the cold working provided for in the tubing joint 20.

The coupling 22a is made of high strength material having surface hardened and roughened external tapered surfaces 30a. The coupling 22a may be thinner than the tubing 26a because of the higher strength material, with the result that the external diameter of the joint 20a is the same as the joint 20 having the external coupling 22.

One advantage of the internal coupling 22a is that if the joint 20a is stressed beyond the yield point of the tubings 26a, the expanded tubing ends 24a, having had their yield strength increased, may still be within the elastic limit. The tubing ends 24a at the joint 20a will contract as the stress is increased, which will increase the contact pressure of the joint. This is the same as for the joint 20. However, before the ultimate is reached in the bodies of the tubings 26a, the yield of the tubing ends 24a may be exceeded, and, when this occurs, the tubing ends tend to contract further, which increases the gripping action, while in the joint 20, the converse is true. Therefore, with this type, the full ultimate strength of the tubings 26a can be developed without extreme cold working of the material of the tubing ends 24a.

The coupling material to accomplish the above result must have a yield strength sufficiently high so that the elastic limit is never exceeded in developing a joint strength equal to the ultimate in the bodies of the tubings 26a.

Coupling and Uncoupling Apparatus 50

Turning now to FIGS. 7 and 13 of the drawings, illustrated therein is an apparatus 50 for making and breaking the tubing joints 20 and 20a. The apparatus 50 is illustrative of various apparatus which may be used for performing the method of the invention of making and breaking the tubing joints 20 and 20a. Consequently, it will be described relatively briefly herein, and will be considered in connection with the tubing joint 20 for convenience.

Referring particularly to FIG. 7 of the drawings, the apparatus 50 may be mounted in a vertical position over an oil well, not shown, into or out of which a tubing string 52, shown as including two of the tubings 26 and one of the tubing joints 20 previously described, is being run, the apparatus 50 providing an axial, i.e., vertical, passageway 54 therethrough for the tubing string. The passageway 54 is shown as open on one side for lateral application to the tubing string 52, if desired.

In considering the apparatus 50 and its operation, it will be assumed that the lowermost tubing 26 and the coupling 22 have previously been frictionally interconnected and that the uppermost tubing 26 and the coupling 22 are to be frictionally interconnected, or disconnected, in order to make up or break, the tubing joint 20.

The apparatus 50 includes a base 56 having the form of a housing which provides two vertical cylinders 58 parallel to and spaced from the passageway 54, it being understood that more than two of the cylinders 58 may be provided if desired. Reciprocable in the cylinders 58 are pistons 60 the supply of operating fluid under pressure to which is controlled by a valve 62. As will be apparent, when the valve 62 is in the position shown, it admits operating fluid under pressure from a supply line 64 into the lower ends of the cylinders 58 through a passage means 66. At the same time, the valve 62 connects a passage means 68, FIGS. 7 and 13, which passage means communicates with the upper ends of the cylinders 58, to an operating fluid return line 70. Under these conditions, the pistons 60 are biased upwardly in their cylinders 58.

It will be noted that under the foregoing conditions, the supply line 64 is connected to the passage means 66 through an external annular channel 72 in the valve 62, and the passage means 68 is connected to the return line 70 through an external annular channel 74 in the valve.

In order to bias the pistons 60 downwardly in their cylinders 58, the valve 62 is moved upwardly, by means of a handle 76, into its uppermost position. Under such conditions, the external annular channel 72 in the valve 62 connects the operating fluid supply line 64 to the passage means 68 leading to the upper ends of the cylinders 58. At the same time, the passage means 66 leading to the lower ends of the cylinders 58 is connected to the operating fluid return line 70 by a passage means 78 through the valve 62 itself.

Thus, the pistons 60 may be moved upwardly or downwardly in their cylinders 58, as required by the hereinafter-described operation of the apparatus 50, by shifting the position of the valve 62.

The pistons 60 have connected thereto upwardly extending piston rods 82 having a crosshead 84 mounted thereon at their upper ends, the vertical passageway 54 for the tubing string 52 extending through the crosshead. In the operation of the apparatus 50, the tubing joint 20 is disposed between the base 56 and the crosshead 84.

Within the base 56 and the crosshead 84 are pairs of horizontally opposed cylinders 86 containing horizontally inwardly and outwardly movable pistons 88 terminating at their inner ends in jaws 90 adapted to grip the tubings 26, the upper jaws being adapted to grip the tubing 26 above the tubing joint 20 and the lower jaws being adapted to grip the tubing 26 below the tubing joint.

As will be apparent, with the two pairs of jaws 90 in engagement with the two tubings 26 as shown, upward movement of the crosshead 84, produced by positioning the valve 62 to deliver operating fluid under pressure to the lower ends of the pistons 60, will tend to break the tubing joint 20. Conversely, downward movement of the crosshead 84, produced by setting the valve 62 in a position to deliver operating fluid under pressure to the upper ends of the pistons 60, is utilized in making up the tubing joint 20.

The two sets of jaws 90 are controlled by a valve 92, FIG. 12, which, in the position shown, admits fluid under pressure from an operating fluid supply line 94 into a passage means 96 leading to the outer ends of the cylinders 86 in the base 56. The piston rods 82 are provided therein with passage means 98 the lower ends of which are in constant communication with the passage means 96 for all positions of the pistons 60, and the upper ends of which communicate with the outer ends of the cylinders 86 in the crosshead 84. Thus, when the valve 92 is in the position shown in FIG. 12 of the drawings, the two sets of jaws 90 are simultaneously energized to grip the two tubings 26 on opposite sides of the tubing joint 20.

By rotating the valve 92 by means of a handle 100 connected thereto, the valve may be moved to a position wherein it cuts off the flow of operating fluid under pressure from the supply line 94, and connects the passage means 96 to an operating fluid return line or exhaust line 102. Under these conditions, the jaws 90 are deenergized to release the tubings 26. If desired, means, not shown, may be provided for automatically retracting the jaws 90 under such conditions.

The apparatus 50 includes a yoke or saddle 104 which, as best shown in FIG. 10 of the drawings, is provided therein with a radial cylinder 106 containing a piston-like injection nozzle 108 having a tapered inner end engageable with the tapered annular seat 38 in the upper half of the coupling 22 and biased outwardly by a spring 109. The outer end of the cylinder 106 has connected thereto a supply line 110 leading to a suitable source, not shown, of fluid under high pressure for injection into the interface between the tapered surfaces 28 and 30 of the upper tubing end 24 and the coupling 22, respectively. As previously indicated, this injection pressure may be of the order of ten to thirty thousand pounds per square inch. As will be apparent, the injection fluid pressure acts on the outer end of the injection nozzle 108 to maintain the inner end thereof in fluid tight engagement with the annular seat 38.

In the construction illustrated in FIG. 10, the saddle 104 is supported by the upper end of the coupling 22, the axial distance from an internal shoulder 111 on the saddle to the center line of the radial cylinder 106 being made equal to the distance from the end of the coupling to the centerline of the tapered seat 38. Axial alignment is therefore maintained by standardizing these dimensions. To provide radial alignment of the injection nozzle 108 with the seat 38, it is desirable to notch the end of the coupling 22 in line with the seat 38, as shown at 112. A key 113 on the saddle 104 fits into the notch 112 and thus permits easy radial alignment of the nozzle 108 with the seat 38. Both the notch 112 and the key 113 are preferably V-shaped in cross section.

*Operation of Apparatus 50*

Considering briefly the over-all operation of the apparatus 50, the various parts thereof are shown in the positions which they would occupy when breaking the upper half of the tubing joint 20. In other words, the valve 92 is in a position to energize the jaws 90, the valve 62 is in a position to cause the pistons 60 to bias the crosshead 84 upwardly to separate the upper tubing end 24 from the coupling 22, and fluid under high pressure is being injected into the interface between the upper tapered surfaces 28 and 30 of the tubing joint. Under these conditions, the tapered surfaces 28 and 30 in question are forced apart by radially inward contraction of the upper tubing end 24 and by radially outward expansion of the upper half of the coupling 22. Under such conditions, the upper tubing 26 may be axially separated from the coupling 22 readily by the pistons 60. It will be understood that the injection pressure acts on the projected area of the tapered surface 28 of the upper tubing end 24 so that, in actuality, it may be necessary to apply very little, if any, pressure to the lower ends of the pistons 60. In fact, under some conditions, it may be necessary to reverse the position of the valve 62 to restrain the upper tubing 26 against too rapid upward movement since the upward force applied by the injection pressure normally will be at least several hundred pounds even with half-inch oil well tubings, and may be many thousands of pounds with larger tubings. This point will be discussed in more detail hereinafter.

In using the apparatus 50 to make up the upper half of the tubing joint 20, the foregoing procedure is reversed, i.e., the upper tubing 26 shown is displaced downwardly to insert the end 24 thereof into the upper half of the coupling 22. To accomplish this, of course, the position of the valve 62 is such as to connect the operating fluid supply line 64 to the upper ends of the cylinders 58. Obviously, under such conditions, the jaws 90 are energized and fluid under high pressure is injected into the interface between the upper tapered surfaces 28 and 30 through the injection nozzle 108.

As previously suggested, the upper tubing 26 must be moved downwardly continuously relative to the coupling 22 as the injection pressure in the interface between the upper tapered surfaces 28 and 30 builds up. If this is not done, the sealing engagements of the end portions of these tapered surfaces will be broken and the injected fluid will leak out, thereby limiting the maximum injection fluid pressure attainable and the resultant contact pressure between the coupling 22 and the upper tubing end 24.

The make-up force which must be applied to the upper tubing 26 in making up the upper half of the tubing joint 20 as hereinbefore outlined depends on the taper of the surfaces 28 and 30, the size of the tubing, the length of taper, the grade of steel in the tubing, and the like. The length of the taper required to obtain a joint strength equal to the yield point of the tubing 26 depends on the coefficient of friction and the shrink pressure, which also is limited to a pressure which stresses the material in the tubing end 24 to the yield point. These factors are related, for a coefficient of friction of 0.20 and an included taper angle of 1° for the tapered surfaces 28 and 30, as set forth in the following table:

| Tubing Size | | Taper Length | J-55 Thrust, lbs. | N-80 Thrust, lbs. | P-105 Thrust, lbs. |
|---|---|---|---|---|---|
| Nominal | O.D. | | | | |
| ½ | .840 | 1.82 | 615 | 895 | 1,175 |
| ¾ | 1.050 | 2.34 | 930 | 1,390 | 1,830 |
| ¾ | 1.315 | 2.98 | 1,505 | 2,190 | 2,870 |
| 1 | 1.660 | 3.82 | 2,400 | 3,490 | 4,530 |
| 1¼ | 1.900 | 4.40 | 3,145 | 4,570 | 5,900 |
| 1½ | 2.000 | 4.59 | 3,485 | 5,050 | 6,650 |
| 1¾ | 2.375 | 5.46 | 4,910 | 7,150 | 9,330 |
| 2 | 2.875 | 6.65 | 7,200 | 10,500 | 13,750 |
| 2½ | 3.500 | 8.10 | 10,675 | 15,500 | 20,400 |
| 3 | 4.00 | 9.33 | 13,900 | 20,200 | 26,600 |
| 3½ | 4.50 | 10.60 | 17,650 | 25,700 | 33,700 |

In the foregoing table, the inside and outside diameters of the tubings and the taper lengths are given in inches, the taper length being the length of one set of the tapered surfaces 28 and 30. The thrust values in pounds are the forces which must be applied to obtain proper make up. The designations "J-55," "N-80" and "P-105" are standard tubing designations of the American Petroleum Institute, the numbers being the yield strength of the material in thousands of pounds per square inch.

The make-up force required varies inversely with the coefficient of friction. Thus, with the threads 44 on the tapered surfaces 30 of the coupling 22, the make-up thrusts of the foregoing table may be cut in half.

The apparatus 50 may be used interchangeably with either the tubing joint 20 or the tubing joint 20a.

Tubing Joint 120

Referring now to FIGS. 14 and 15 of the drawings, illustrated therein is a tubing joint 120 which, basically, is similar to the tubing joints 20 and 20a. The various components of the tubing joint 120 are identified by reference numerals higher by one hundred than the reference numerals used to identify corresponding components of the tubing joint 20.

The tubing joint 120 differs from the joint 20 in that the tapered surfaces 128 and 130, instead of being relatively smooth, or slightly roughened, as by means of extremely shallow threads 44 on the tapered surfaces 30, are provided with relatively shallow threads 148 and 150, respectively. The principal purpose of the threads 148 and 150 is to provide a means of making up the tubing joint 120, as the injection pressure is applied between the tapered surfaces 128 and 130 by relative rotation of the coupling 122 and the tubing ends 124. In other words, the threads 148 and 150 produce the axial movement of the coupling 122 and each tubing end 124 which is necessary in making up or breaking each half of the tubing joint 120 in response to relative rotation of these components, instead of by straight linear relative axial movement thereof. The mechanical interlock obtained is of secondary importance, but it does add to the joint strength and the surface area subject to shrink pressure may be correspondingly reduced. The division of joint strength between mechanical interlock and frictional gripping depends upon the proportions selected.

With the foregoing in mind, it will be apparent that the threads 148 and 150 may be quite shallow. For example, maximum depths for the threads 148 and 150 ranging from 0.010 inch to 0.030 inch are adequate.

Preferably, the threads 148 and 150 are modified square threads, actually trapezoidal threads, the flanks of which include angles of the order of 10°. Even at the shallow depths mentioned the flank contact pressures during make-up or breaking of the joint are limited to reasonable values, the maximum depth of the threads preferably being less than one-quarter of the pitch thereof. Also, the width of the threads 148 and 150 is preferably such as to provide flank clearances of 0.002 inch to 0.005 inch to prevent interference flank pressure.

To prevent any reduction in section at the roots of the first convolutions of the threads 148 and 150, these are made vanishing threads with tapered thread depths. This is accomplished by using two thread taper angles. More particularly, the taper of the major diameter of the tubing thread 148 is the same as the taper of the minor diameter of the coupling thread 150, and the taper of the minor diameter of the tubing thread 148 is the same as the taper of the major diameter of the coupling thread 150. The two threads 148 and 150 then are in frictional engagement at their crests and roots, with clearances at their flanks.

The thread taper angles used depend on the size of the tubings 126. Merely by way of example, it has been found that with half-inch tubing, the major taper angle can be 45' on a side and the minor 1°30' on a side. This gives a thread depth of 0.016 inch at the smaller ends of the tapers of the tubing ends 124, vanishing to zero adjacent the larger ends. The taper at the root of each tubing thread 148 may be of the order of three-quarters inch per foot, which is conventional for ordinary tubing and for casing. With this angle, the thread 148 is easily stabbed into the coupling 122 with very little possibility of damage.

With the threaded tubing joint 120, the tubing end 124 to be connected to the coupling 122 is stabbed into the coupling and made up hand tight. The injection pressure is then applied to the interface between the tapered surfaces 128 and 130 and the half of the tubing joint 120 involved is made up with a torque sufficient to offset the hydraulic thrust of the pressure force component acting in the axial direction on the projected area of the tapered surface 128. When the required shrink pressure is achieved, it is released and the joint is finished. It should be pointed out that, as in the case of the tubing joint 20, the make-up utilizing the threads 148 and 150 must continue in direct proportion to the increase in the shrink pressure. If this is not done, the seals provided by interengagement of the end portions of the tapered surfaces 128 and 130 will be lost and the injected fluid will leak out, thereby limiting the shrink pressure to too low a value.

In connection with the foregoing, it will be noted from FIG. 14 of the drawings that the threads 148 and 150 stop short of the smaller ends of the tapered surfaces 128 and 130 to permit maintaining a fluid tight seal during injection. Similarly, the threads 148 and 150 vanish to zero short of the larger ends of the tapered surfaces 128 and 130 to permit maintaining a fluid tight seal at this point. It will also be noted that the injection passage means 132 does not include any internal annular groove in the coupling 122 corresponding to the annular groove 34. No such internal annular groove is necessary since the flank clearances between the threads 148 and 150 serve to distribute the injected fluid throughout the portion of the interface between the tapered surfaces 128 and 130 wherein such tapered surfaces are to be forced apart in the radial direction in making up, or breaking, each joint half.

It will be understood that breaking each half of the threaded tubing joint 120 is essentially the reverse of making it, it being necessary to in effect unscrew the corresponding tubing end 124 from the corresponding end of the coupling 122 after application of the injection pressure in the interface to relieve the shrink fit.

An apparatus for making up and breaking the threaded tubing joint 120 will be considered in a subsequent section.

Tubing Joint 120a

A threaded tubing joint 120a, FIG. 14a, may also be used which is similar to the tubing joint 120, but which has an internal coupling like the tubing joint 20a. The parts of the tubing joint 120a are identified in FIG. 14a by adding the suffix "a" to the reference numbers of FIG. 14.

FIG. 14a shows the application of the tapered depth modified square thread to the internal coupling type of joint 120a. In this case the thread 148a is of maximum depth at the extremity of the tubing end 124a and runs out to zero as it approaches the body of the tubing 126a. The thread 150a on the coupling 122a is of maximum depth near the middle of the coupling and runs out to zero at the ends of the coupling.

Coupling and Uncoupling Apparatus 160

Illustrated in FIGS. 16 to 18 of the drawings is a coupling and uncoupling apparatus 160 for making up and breaking the threaded tubing joints 120 and 120a. Basically, the apparatus 160 is identical to the apparatus 50 so that only the differences will be discussed, identical reference numerals being applied to identical parts.

In the apparatus 160, a crosshead 161 similar to the crosshead 84 is provided with a tubular upward extension 162 on which a rotor 164 is mounted by means of bearings 166 and 168. The rotor 164, which is rotatable about the axis of the tubing string formed by the tubings 126 and the joint 122, or the tubings 126a and the joint 122a, carries a peripheral gear 170 driven by a pinion 172, FIGS. 17 and 18, on the output shaft of a rotary hydraulic motor 174 mounted on the crosshead 161. Flexible operating fluid supply and return lines 176 and 178 are connected to the motor 174.

The rotor 164 is provided adjacent its upper end with horizontal cylinders 180, shown as three in number, containing horizontally inwardly and outwardly movable pistons 182 terminating at their inner ends in jaws 184 adapted to grip the upper tubing 126 or 126a. The lower tubing 126 or 126a is gripped by the lower set of jaws 90 previously described. The upper jaws 184 are energized under the control of the valve 92 through the previously described passage means 98 in one of the piston rods 82, and through passage means 186 in the crosshead 161, passage means 188 in the crosshead extension 162, and passage means 190 in the rotor 164, the passage means 188 and 190 being in constant communication.

The injection means for injecting fluid under high pressure into the interface between the tapered surfaces 128 and 130 of the upper half of the tubing joint 120 may be similar to that previously described in connection with the apparatus 50. However, the injection means of the apparatus 160 is shown as including a split collar 192 having pivoted sections which may be swung into position around the coupling 122 or 122a.

Operation of Apparatus 160

In using the apparatus 160 with the tubing joint 120, the lower set of jaws 90 and the upper set of jaws 184 on the rotor 164 are energized and deenergized by means of the valve 92 described previously. The valve 62 for applying pressure to the upper or lower ends of the pistons 60 is merely operated, in the apparatus 160, to lift the threaded lower end of the upper tubing 126 out of the coupling 122 and to stab it into the coupling. In actually making up or breaking the upper half of the tubing joint 120, the threads 148 and 150 do the work in response to rotation of the upper tubing 126 relative to the coupling 122 by the rotor 164. Under such conditions, it is contemplated that no pressure be applied to the pistons 60 controlling the vertical position of the crosshead 161. To achieve this, the valve 62 may be provided with a neutral position, not shown. Alternatively, pressure may be applied to the pistons 60 in a direction to assist the threads 148 and 150 in making up or breaking the upper half of the tubing joint 120.

As will be apparent, after the tapered and threaded lower end 124 of the upper tubing 126 has been stabbed into the upper end of the coupling 122, and preferably hand tightened, the motor 174 is energized and fluid under high pressure is injected into the interface between the tapered surfaces 128 and 130 through the injection nozzle 108 in the manner hereinbefore described. It will be understood that, under the foregoing conditions, the upper and lower sets of jaws 184 and 90 are energized. The motor 174 keeps making up the upper half of the tubing joint 120 as the lower end of the upper tubing 126 is radially contracted and the upper end of the coupling 122 is radially expanded, thereby preventing loss of the injected fluid at the ends of the tapered surfaces 128 and 130. Ultimately, when the upper half of the tubing joint 120 is completely made up, the motor 174 stalls. Thereupon, the injection pressure in the interface between the tapered surfaces 128 and 130 may be released, whereupon the upper half of the coupling 122 shrinks onto the lower end of the upper tubing 126. As previously pointed out, the strength of the tubing joint 120 is primarily due to this shrink fit, and the primary function of the threads 148 and 150 is in making up the joint. However, the mechanical interlock of the threads adds to the strength.

The procedure in breaking the upper half of the tubing joint 120 is similar to the procedure in making up same, but reversed. Consequently, a further description is not necessary.

The apparatus 160 may be used interchangeably in making up or breaking either of the tubing joints 120 or 120a.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim:

1. A friction-type tubing joint for connecting tubings in axially aligned relation to form a tubing string capable of withstanding high internal fluid pressure and high axial tension and developing a joint strength at least substantially equal to the nominal yield strength of the tubing, said tubing having a wall thickness that is relatively small compared to the outer diameter of the tubing, said joint including:

(a) inner and outer tubular members one of which is an end of one of said tubings, (b) said inner and outer tubular members respectively having at their ends telescopable complementary outer and inner tapered surfaces tapering from the common axis of said tubular members and adapted to assume a first inserted position and to be relatively moved axially to a further inserted position where said tapered surfaces are in contact with each other with high contact pressure resulting in a high hoop tension stress in said outer tubular member of a value less than the yield strength of the material thereof and a high hoop compression stress in said inner tubular member of a value less than the yield strength of the material thereof, said tapered surfaces frictionally engaging each other in said further inserted position along an interface with full engagement of their peripheral faces from end to end of said interface, (c) an axial load applied to one of said tubular members being transferred to the other member along said interface, (d) the coefficient of friction between said engaged tapered surfaces, the contact pressure therebetween and the axial length of said tapered surfaces in contact with each other being such that the total friction force resisting disengagement of said frictionally engaged tapered surfaces is at least substantially equal to the nominal yield strength of said one of said tubings.

2. A tubing joint as defined in claim 1 in which the materials and sizes of said tubular members are so selected and associated that with transfer of said axial load along said interface at least a portion of said outer member contracts on said inner member to thereby increase the contact pressure adjacent such portion.

3. A tubing joint as defined in claim 1 in which the resistance to disengagement of the joint is equal to the ultimate strength of the tubing, and in which the joint end of said one of said tubings is a cold-worked end having a unit yield strength in the vicinity of its tapered surface greater than the nominal unit yield strength of such tubing.

4. A tubing joint as defined in claim 1 in which the axial length of each tapered surface is no more than about 2.5 times the nominal outer diameter of said tubing.

5. A tubing joint as defined in claim 1 in which the coefficient of friction between said engaged tapered surfaces is no less than .2.

6. A tubing joint as defined in claim 1 in which the taper angle of each tapered surface is no more than about 3° included angle.

7. A friction-type tubing joint for connecting tubings in axially aligned relation to form a tubing string capable of withstanding high internal fluid pressure and high axial tension and developing a joint strength at least substantially equal to the nominal yield strength of the tubing, said tubing having a wall thickness that is relatively small compared to the outer diameter of said tubing, said joint including:

(a) inner and outer tubular members one of which is an end of one of said tubings, (b) said outer tubular member having an inner tapered surface converging axially inwardly from an end of said outer tubular member, (c) said outer tubular member having a passage with its inner end opening on said inner tapered surface at a position between the ends of such surface, (d) said inner tubular member having an outer tapered surface complementary to said inner tapered surface and diverging axially from an end of said inner member, (e) said members being movable axially relative to each other to an initial position in which said end of said inner member is beyond said inner end of said passage and said tapered surfaces are engaged with an initial contact pressure both in longitudinally spaced fluid-sealing regions on opposite sides of said passage end and throughout a central region intermediate such sealing regions, (f) said tapered surfaces in said central region being temporarily deformable by introduction of high-pressure fluid through said passage to said central region to expand said outer member and contract said inner member enabling further relative axial movement of said inner member into said outer member while preventing escape of such high-pressure fluid by continued engagement of said tapered surfaces in such longitudinally spaced fluid-sealing regions during the further relative axial movement, whereby relieving such fluid pressure allows contraction of said outer member and expansion of said inner member into interfacial contact with full engagement of the peripheral faces of said tapered surfaces from end to end of said interface to produce a shrink fit between said tapered surfaces to induce an increased contact pressure therebetween higher than said initial contact pressure, (g) an axial load applied to one of said tubular members being transferred to the other member along said interface, (h) the coefficient of friction between said engaged tapered surfaces, the increased contact pressure therebetween produced by said shrink fit, and the axial length of said tapered surfaces in contact with each other being such that the total friction force resisting disengagement of the frictionally engaged tapered surfaces is at least substantially equal to the nominal yield strength of said one of said tubings.

8. A joint as defined in claim 7 in which (i) said passage provides an outer end opening on the exterior of said outer tubular member, (j) said passage being free of any closure means and remaining open at all times to the exterior of said outer member to thereby provide a bleed hole, (k) one of said tubular members providing a groove near that end of its tapered surface that is exposed to any high internal pressure within the tubing string, (l) and a sealing member in said groove engaging the other tapered surface aiding the sealing action of the adjacent fluid-sealing region of said engaged surfaces in preventing fluid leakage from within the tubing string to said central region.

9. A friction joint as defined in claim 7 including:

(i) means for relatively axially moving said inner and outer tubular members during make-up and breaking of said joint, said means including (j) mating shallow threads on said inner and outer tubular members exclusively in said central region complementarily tapered from zero depth at one of said fluid-sealing regions to a maximum depth less than one-half the thread width at the other of said fluid-sealing regions, (k) said inner tapered surface in said central region being formed by alternate crest and root surfaces of the threads of said outer tubular member, constituting a large portion of one of said peripheral faces, (l) said outer tapered surface in said central region being formed by alternate crest and root surfaces of the threads of said inner tubular member, constituting a large portion of the other of said peripheral faces, (m) said threads being provided with a small flank clearance providing a minute helical passage transmitting said high-pressure fluid throughout the axial length of said central region, (n) the shrink fit in said central region being between the crest surfaces of the threads on either member and the root surfaces of the threads on the other member throughout said central region except for the small portion thereof occupied by said minute helical passage, (o) said threads functioning primarily to cause relative axial movement of said members upon relative turning thereof while said high-pressure fluid is present.

10. A friction-type tubing joint for connecting tubings in axially aligned relation to form a tubing string capable of withstanding high internal fluid pressure and high axial tension and developing a joint strength at least substantially equal to the nominal yield strength of the tubing, said tubing having a wall thickness that is relatively small compared to the outer diameter of said tubing, said joint including:

(a) a tubular coupling having at least one inner tapered surface converging axially inwardly from at least one end of the coupling throughout an end portion of the coupling, said end portion of said coupling constituting an outer tubular member, (b) the end portion of one of said tubings constituting an inner tubular member, (c) said end portion of said tubing having an outer tapered surface complementary to said inner tapered surface and diverging axially from the end of said tubing, (d) the end portions of said coupling and said tubing being adapted to assume a first inserted position and to be relatively moved axially to a further inserted position where said tapered surfaces are in contact with each other with high contact pressure resulting in a high hoop tension stress in said end portion of said coupling and a high hoop compression stress in said end portion of said tubing, said tapered surfaces frictionally engaging each other in said further inserted position along an interface with full engagement of their peripheral faces from end to end of said interface, (e) an axial load applied to one of said members being transferred to the other member along said interface, (f) the body of said coupling at the smaller end of its tapered surface having an axial yield strength greater than the nominal axial yield strength of said tubing, (g) the materials and sizes of said end portions of said coupling and tubing being so selected and associated that with transfer of said axial load along said interface at least a portion of said end portion of said coupling contracts on said end portion of said tubing to thereby increase the contact pressure adjacent such portion, (h) the coefficient of friction between said engaged tapered surfaces, the contact pressure therebetween and the axial length of said tapered surfaces in contact with each other being such that the total friction force resisting disengagement of said frictionally engaged tapered surfaces is at least substantially equal to the nominal yield strength of said one of said tubings.

11. A joint as defined in claim 10 in which (i) the resistance to disengagement of the joint is equal to the ultimate strength of the tubing, (j) said body of said coupling at said smaller end of its tapered surface has an axial ultimate strength greater than the nominal axial ultimate strength of said tubing, and in which (k) said end portion of said tubing has a cold-worked enlarged transverse section having a yield strength greater than the ultimate strength of said tubing at a point remote from said joint.

12. A friction-type tubing joint for connecting tubings in axially aligned relation to form a tubing string capable of withstanding high internal fluid pressure and high axial tension and developing a joint strength at least substantially equal to the nominal yield strength of the tubing, said tubing having a wall thickness that is relatively small compared to the outer diameter of the tubing, said joint including:

(a) a tubular coupling having at least one outer tapered surface diverging axially from at least one end of the coupling throughout an end portion of the coupling, said end portion of the coupling constituting an inner tubular member, (b) the end portion of one of said tubings constituting an outer tubular member, (c) said end portion of said tubing having an inner tapered surface complementary to said outer tapered surface and converging axially from the end of said tubing, (d) the end portions of said coupling and said tubing being adapted to assume a first inserted position and to be relatively moved axially to a further inserted position where said tapered surfaces are in contact with each other with high contact pressure resulting in a high hoop tension stress in said end portion of said tubing and a high hoop compression stress in said end portion of said coupling, said tapered surfaces frictionally engaging each other in said further inserted position along an interface with full engagement of their peripheral faces from end to end of said interface, (e) an axial load applied to one of said tubular members being transferred to the other member along said interface, (f) the body of said coupling at the larger end of its tapered surface having an axial yield strength greater than the nominal axial yield strength of said tubing, (g) the coefficient of friction between said engaged tapered surfaces, the contact pressure therebetween induced by said hoop stresses, and the axial length of said tapered surfaces in contact with each other being such that the total friction force resisting disengagement of said frictionally engaged tapered surfaces is at least substantially equal to the nominal yield strength of said tubing.

13. A joint as defined in claim 12 in which (h) the resistance to disengagement of the joint is at least equal to the ultimate strength of said tubing, (i) the strength of said body of said coupling at the larger end of its tapered surface has an axial ultimate strength greater than the nominal axial ultimate strength of said tubing, and (j) the materials and sizes of said end portions of said coupling and tubing being so selected and associated that with transfer of said axial load along said interface and when at least a portion of the material of said end portion of said tubing is stressed beyond the yield point such stressed portion of said tubing end portion will contract on said end portion of said coupling to thereby increase the contact pressure adjacent said portion.

14. A joint as defined in claim 12 in which (h) said end portion of said tubing is a diametrically enlarged portion having internal and external diameters larger than the nominal internal and external diameters of said tubing, (i) said tubular coupling having an internal diameter substantially equal to the nominal internal diameter of said tubing.

References Cited in the file of this patent

UNITED STATES PATENTS

| | | |
|---|---|---|
| 961,375 | Seabrook | June 14, 1910 |
| 1,067,516 | Gleeson | July 15, 1913 |
| 1,499,581 | Kibele | July 1, 1924 |
| 1,883,662 | Fisher | Oct. 18, 1932 |
| 2,062,407 | Eaton | Dec. 1, 1936 |
| 2,150,221 | Hinderliter | Mar. 14, 1939 |
| 2,267,923 | Johnson | Dec. 30, 1941 |
| 2,315,792 | Hoss | Apr. 6, 1943 |
| 2,348,293 | Hamer | May 9, 1944 |
| 2,564,670 | Bratt | Aug. 21, 1951 |
| 2,671,949 | Welton | Mar. 16, 1954 |
| 2,855,224 | Boice | Oct. 7, 1958 |
| 2,921,802 | Cannen | Jan. 19, 1960 |
| 2,992,479 | Musser et al. | July 19, 1961 |
| 3,003,231 | Tiess | Oct. 10, 1961 |

FOREIGN PATENTS

| | | |
|---|---|---|
| 19,501 | Great Britain | Sept. 3, 1896 |
| 8,884 | Great Britain | Apr. 16, 1898 |

OTHER REFERENCES

Handbook of Chemistry and Physics, 36th Edition, page 1976, published 1954, copy in Division 57.